United States Patent
Joshi et al.

(10) Patent No.: US 10,381,889 B2
(45) Date of Patent: Aug. 13, 2019

(54) PERMANENT MAGNET MACHINE WITH SEGMENTED SLEEVE FOR MAGNETS

(71) Applicant: General Electric Company, Schenectady, NY (US)

(72) Inventors: Narendra Digamber Joshi, Schenectady, NY (US); Manoj Ramprasad Shah, Latham, NY (US); James William Bray, Niskayuna, NY (US); Randy Marinus Vondrell, Sharonville, OH (US); Kurt David Murrow, Liberty Township, OH (US); Jeffrey Anthony Hamel, Maineville, OH (US); Samuel Jacob Martin, Cincinatti, OH (US)

(73) Assignee: General Electric Company, Schenectady, NY (US)

( * ) Notice: Subject to any disclaimer, the term of this patent is extended or adjusted under 35 U.S.C. 154(b) by 550 days.

(21) Appl. No.: 14/317,294

(22) Filed: Jun. 27, 2014

(65) Prior Publication Data
US 2015/0380999 A1 Dec. 31, 2015

(51) Int. Cl.
*H02K 1/28* (2006.01)
*H02K 1/27* (2006.01)
(Continued)

(52) U.S. Cl.
CPC .............. *H02K 1/28* (2013.01); *H02K 1/278* (2013.01); *H02K 1/182* (2013.01); *H02K 1/30* (2013.01);
(Continued)

(58) Field of Classification Search
CPC .......... H02K 1/28; H02K 1/278; H02K 21/24; H02K 21/2713; H02K 21/2793;
(Continued)

(56) References Cited

U.S. PATENT DOCUMENTS 3,846,651 A * 11/1974 Mishra .................... H02K 1/24
310/269
3,979,821 A * 9/1976 Noodleman ......... H02K 13/006
148/108

(Continued)

FOREIGN PATENT DOCUMENTS

FR 2986388 A1 8/2013
JP 05251219 B2 7/2013
(Continued)

OTHER PUBLICATIONS 14317294-550313-EICSearch, EIC STIF Search Report.*
(Continued)

*Primary Examiner* — Thomas Truong
*Assistant Examiner* — Maged M Almawri
(74) *Attorney, Agent, or Firm* — Joseph Christian

(57) ABSTRACT

A permanent magnet machine and a rotor assembly for the permanent magnet machine. The permanent magnet machine includes a stator assembly including a stator core configured to generate a magnetic field and extending along a longitudinal axis with an inner surface defining a cavity and a rotor assembly including a rotor core and a rotor shaft. The rotor core is disposed inside the stator cavity and configured to rotate about the longitudinal axis. The rotor assembly further including a plurality of permanent magnets for generating a magnetic field which interacts with the stator magnetic field to produce torque. The permanent magnets are disposed within one or more cavities formed in a sleeve component. The sleeve component configured to include a plurality of cavities or voids therein and thus provide minimal weight to the permanent magnet machine. The permanent magnet machine providing increased centrifugal load capacity, increased power density and improved electrical performance.

16 Claims, 4 Drawing Sheets

(51) Int. Cl.
*H02K 1/18* (2006.01)
*H02K 1/30* (2006.01)
*H02K 21/24* (2006.01)
*H02K 49/10* (2006.01)
*H02K 21/02* (2006.01)

(52) U.S. Cl.
CPC .......... *H02K 21/026* (2013.01); *H02K 21/24* (2013.01); *H02K 49/108* (2013.01); *Y02E 10/725* (2013.01)

(58) Field of Classification Search
CPC .... H02K 21/026; H02K 37/08; H02K 49/108; H02K 1/182; H02K 1/30; Y02E 10/725
USPC ... 310/156.12, 156.28, 49.32, 49.39, 156.32, 310/156.36, 156.82, 216.011, 216.013, 310/216.051, 216.044, 216.049, 216.113, 310/433, 216.053, 216.078, 216.086, 310/216.087, 216.088, 156.13, 156.14, 310/156.08, 156.29, 14, 261.1, 262–271
See application file for complete search history.

(56) References Cited

U.S. PATENT DOCUMENTS

| | | | | |
|---|---|---|---|---|
| 4,445,062 | A * | 4/1984 | Glaser | H02K 1/2773 310/156.59 |
| 6,127,764 | A * | 10/2000 | Torok | H02K 1/276 310/156.53 |
| 6,175,177 | B1 * | 1/2001 | Sabinski | H02K 1/2773 310/156.55 |
| 7,646,178 | B1 * | 1/2010 | Fradella | H02K 1/2793 322/22 |
| 8,018,110 | B2 * | 9/2011 | Alexander | H02K 1/2773 310/156.56 |
| 8,723,383 | B2 * | 5/2014 | Blanc | H02K 1/2773 310/156.22 |
| 8,987,971 | B2 * | 3/2015 | Reddy | H02K 1/2766 310/156.59 |
| 10,193,402 | B2 * | 1/2019 | Bueno De Santiago | H02K 1/06 |
| 2002/0079770 | A1 * | 6/2002 | Lai | H02K 1/278 310/156.28 |
| 2002/0125780 | A1 * | 9/2002 | Shiratori | H02K 1/278 310/156.21 |
| 2004/0150281 | A1 * | 8/2004 | Malmberg | H02K 1/278 310/156.28 |
| 2006/0006744 | A1 * | 1/2006 | Nashiki | H02K 1/145 310/49.37 |
| 2008/0042515 | A1 | 2/2008 | Butterfield | |
| 2008/0143207 | A1 * | 6/2008 | Shah | H02K 1/146 310/156.08 |
| 2008/0284268 | A1 * | 11/2008 | Yuratich | E21B 43/128 310/156.09 |
| 2010/0019599 | A1 * | 1/2010 | Saban | H02K 1/02 310/156.12 |
| 2010/0209872 | A1 * | 8/2010 | Kuhn | A61C 1/06 433/131 |
| 2012/0024610 | A1 * | 2/2012 | Woolmer | H02K 5/18 180/65.51 |
| 2012/0126653 | A1 * | 5/2012 | Yang | H02K 1/146 310/156.32 |
| 2012/0133231 | A1 * | 5/2012 | Hayakawa | H02K 21/24 310/156.37 |
| 2013/0140932 | A1 * | 6/2013 | Reddy | H02K 1/26 310/156.01 |
| 2014/0139065 | A1 * | 5/2014 | Yamada | H02K 21/16 310/156.66 |

FOREIGN PATENT DOCUMENTS

WO 02103882 A1 12/2002
WO 2014002181 A1 1/2014

OTHER PUBLICATIONS

Dutta, R., and M. F. Rahman. "Design and Analysis of an Interior Permanent Magnet (IPM) Machine With Very Wide Constant Power Operation Range." IEEE Transactions on Energy Conversion 23.1 (2008): 25-33.

Mulcahy, T.M., J.R. Hull, K.I. Uherka, R.G. Abboud, J.H. Wise, D.W. Carnegie, C.E. Bakis, and C.W. Gabrys. "A Permanent-Magnet Rotor for a High-Temperature Superconducting Bearing." IEEE Transactions on Magnetics 32.4 (1996): 2609-2612.

European Search Report and Opinion issued in connection with corresponding EP Application No. 15173429.0 dated Nov. 4, 2015.

* cited by examiner

PERMANENT MAGNET MACHINE WITH SEGMENTED SLEEVE FOR MAGNETS

BACKGROUND

The present disclosure relates to permanent magnet machines. More particularly, the present disclosure relates to a high-speed permanent magnet motor machine with high power density.

Interior Permanent Magnet Machines (IPMs) such as permanent magnet motors or generators have been widely used in a variety of applications including aircraft, automobile, subsea and industrial usage. A requirement for lightweight and high power density permanent magnet machines has resulted in the design of higher speed motors and generators to maximize the power to weight ratios. Hence, the trend is increasing acceptance of permanent magnet machines offering high machine speed, high power density, reduced mass and cost.

Permanent magnet motors typically employ permanent magnets either in the rotor, the stator or both. In most instances, the permanent magnets are found within the rotor assembly. The output power of the permanent magnet motor is determined by the length, diameter, air gap magnetic flux, armature current density, speed, and cooling ability of the stator and rotor assemblies.

In conventional internal permanent magnet machines, multiple permanent magnets are embedded inside multiple laminations of a rotor. The mechanical stresses in the rotor are concentrated in multiple bridges and center posts. For higher speed applications, the thickness of the multiple bridges and center posts have to be increased for enhanced structural strength of the rotor and various other parts. The bridges of posts with increased thickness lead to higher magnet flux leakage, which significantly reduces the machine power density, resulting in decreased efficiency of the machine.

In one specific embodiment, segmented permanent magnets are captured by a sleeve component, and more particularly an Inconel sleeve configured about the permanent magnets. The Inconel sleeve encompasses the magnets and provides support for the magnets in the radial direction. The maximum rotational speed of the rotor is dependent on the thickness of the Inconel sleeve and the mass of the permanent magnets. The speed at which the rotor can turn safely is limited by centrifugal loading on the permanent magnets and the overall weight, including that of the sleeve component. In addition, for radial machines and general armature types, the sleeve component needs to be non-magnetic to avoid shorting the flux path before it moves from rotor to armature. It would transport flux better if it were magnetic, but that would require some kind of non-magnetic separations in the shell between the locations of the magnetic poles, and this would be a difficult-to-construct composite material. In other words, the magnetic circuit, or total magnetic reluctance, needs to be optimal.

Therefore, it is desirable to provide a permanent magnet machine including a sleeve component having an increased centrifugal load capacity in light of reduced overall weight, so as to provide increased power density and improved electrical performance.

BRIEF DESCRIPTION

These and other shortcomings of the prior art are addressed by the present disclosure, which provides a rotor assembly for a permanent magnet machine and a permanent magnet machine.

One aspect of the present disclosure resides in a rotor assembly for a permanent magnet machine configured to rotate about a longitudinal axis. The rotor assembly including a rotor shaft and at least one rotor module configured to generate a magnetic field, whose magnetic field interacts with a stator magnetic field to produce a torque. The at least one rotor module is disposed about the rotor shaft and comprises a plurality of permanent magnets and a sleeve component including a plurality of cavities formed therein. At least one of the plurality of permanent magnets is disposed within one of the plurality of cavities formed in the sleeve component to retain the at least one permanent magnet therein and form an interior permanent magnet motor.

Another aspect of the present disclosure resides in a rotor assembly for a permanent magnet machine configured to rotate about a longitudinal axis. The rotor assembly including a rotor shaft and a plurality of rotor modules configured to generate a magnetic field, whose magnetic field interacts with a stator magnetic field to produce a torque. The plurality of rotor modules are disposed about the rotor shaft in an end-to-end axial alignment and cooperative engagement. Each of the plurality of rotor modules defining a rotor core comprising a plurality of permanent magnets and a sleeve component including a plurality of cavities formed therein. At least one of the plurality of permanent magnets is disposed within one of the plurality of cavities formed in the sleeve component to retain the at least one permanent magnet therein and form an interior permanent magnet motor.

Yet another aspect of the disclosure resides in a permanent magnet machine comprising a stator assembly and a rotor assembly. The stator assembly including a stator core and stator windings to generate a stator magnetic field when excited with alternating currents. The stator assembly extending along a longitudinal axis with an inner surface defining a cavity. The rotor assembly is disposed inside said cavity and configured to rotate about the longitudinal axis. The rotor assembly including at least one rotor module configured to generate a magnetic field, which magnetic field interacts with a stator magnetic field to produce a torque, each of the at least one rotor module including a rotor core. The rotor core including a plurality of permanent magnets and a sleeve component including a plurality of cavities formed therein. At least one of the plurality of permanent magnets is disposed within one of the plurality of cavities formed in the sleeve component to retain the at least one permanent magnet and form an interior permanent magnet motor. An air gap is defined between the rotor assembly and the stator assembly.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
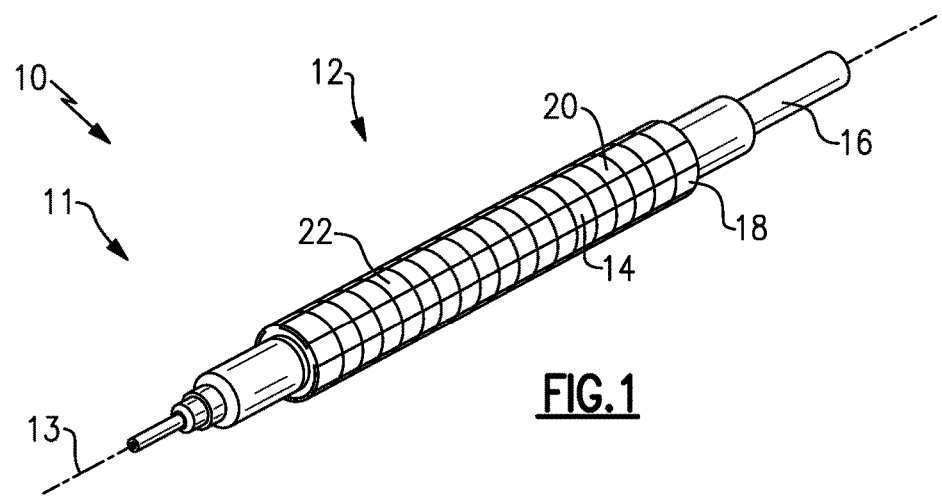
FIG. 1 is an isometric view of a rotor assembly of a permanent magnet machine in accordance with one or more embodiments shown or described herein.

The disclosure will be described for the purposes of illustration only in connection with certain embodiments; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

As described in detail below, embodiments of the present disclosure provide a permanent magnet machine including a sleeve component having an increased centrifugal load capacity in light of reduced overall weight, so as to provide increased power density and improved electrical performance. Using such disclosed configurations, the permanent magnet machine may include efficient operation at high speeds and thus efficiency of the system to which it drives.

The terms "first," "second," and the like, herein do not denote any order, quantity, or importance, but rather are used to distinguish one element from another and intended for the purpose of orienting the reader as to specific components parts. Approximating language, as used herein throughout the specification and claims, may be applied to modify any quantitative representation that could permissibly vary without resulting in a change in the basic function to which it is related. The modifier "about" used in connection with a quantity is inclusive of the stated value, and has the meaning dictated by context, (e.g., includes the degree of error associated with measurement of the particular quantity). Accordingly, a value modified by a term or terms, such as "about", is not limited to the precise value specified. In some instances, the approximating language may correspond to the precision of an instrument for measuring the value.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise. In addition, in this specification, the suffix "(s)" is usually intended to include both the singular and the plural of the term that it modifies, thereby including one or more of that term (e.g., "the rotor module" may include one or more rotor modules, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur—this distinction is captured by the terms "may" and "may be". The terms "comprising," "including," and "having" are intended to be inclusive and mean that there may be additional elements other than the listed elements. Any examples of operating parameters are not exclusive of other parameters of the disclosed embodiments.

As discussed in detail below, embodiments of the disclosure are directed towards a permanent magnet machine including a rotor assembly having an increased centrifugal load capacity in light of reduced overall weight, so as to provide increased power density and improved electrical performance. The permanent magnet machine includes a sleeve component forming a portion of a rotor core and configured for engagement with multiple permanent magnets, the sleeve component being mounted circumferentially around a shaft in a rotor assembly. In particular, the present disclosure is directed to a permanent magnet machine operating at high speeds as determined by the tip speed of the rotor (generally <350 m/s).

Figure 2:
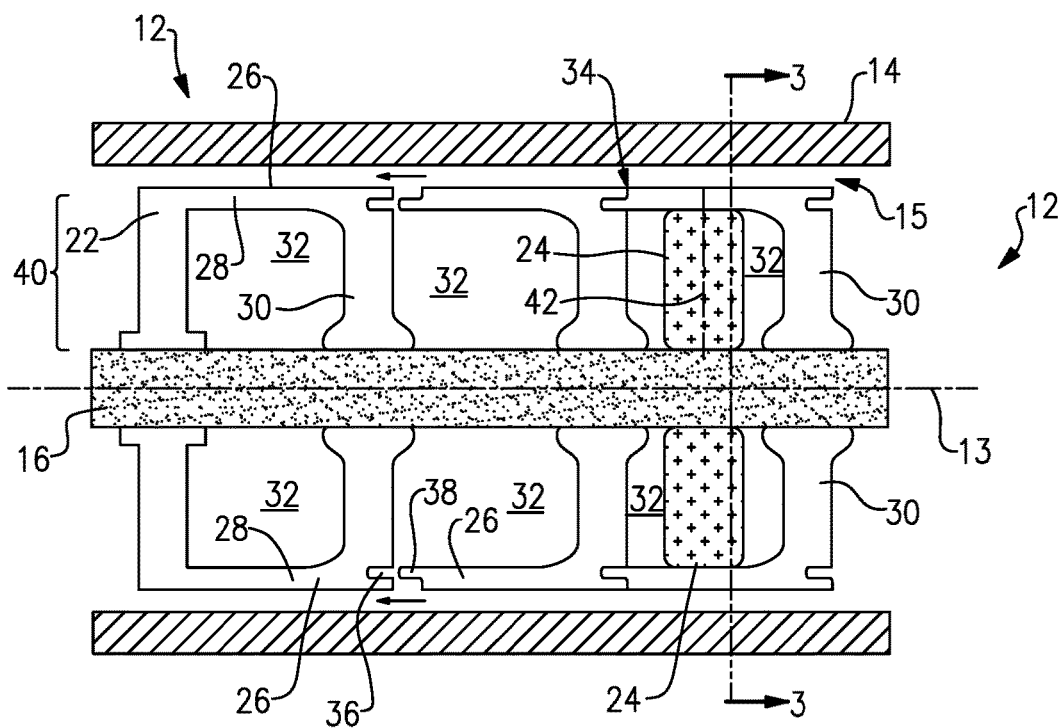
FIG. 2 is a longitudinal cross-sectional view of a portion of a rotor and stator assembly of a permanent magnet machine in accordance with one or more embodiments shown or described herein.

Referring now to the figures, FIGS. 1-7 illustrate embodiments of a permanent magnet machine, and more particularly a permanent magnet motor according to the present disclosure including a plurality of interior permanent magnets. Referring specifically to FIGS. 1 and 2, illustrated is a portion of a permanent magnet machine 10, such as a permanent magnet motor 11. In an embodiment, the permanent magnet machine 10 may be used for driving at least one of an aircraft engine, a pump, a wind turbine, a gas turbine, or a generator. FIG. 1 illustrates in an isometric view a rotor assembly 12 configured to rotate via a magnetic rotor shaft 16, along a longitudinal axis 13. FIG. 2 illustrates in a longitudinal cross-section, a portion of the permanent magnet machine 10 of FIG. 1, including the rotor assembly 12 and a stator assembly 14 configured along the longitudinal axis 13. In an embodiment, a metal in the stator assembly 14 surrounding an armature portion (not shown) is magnetic to carry the magnetic flux optimally to and from the rotor field magnets, and additionally this metal is laminated directionally to reduce optimally eddy current heating in the metal and thereby improve motor efficiency. As best illustrated in FIG. 2, the rotor assembly 12 and the stator assembly 14 are spaced apart to define therebetween an air gap 15. In FIG. 1, an optional cylindrical cover 18 of the rotor assembly 12 is illustrated as partially removed to illustrate one or more rotor modules 20 of the rotor assembly 12. Each rotor module 20 of the rotor assembly 12 includes a rotor core 40 including a sleeve component 22, configured to retain a plurality of magnets 24 therein. More particularly, as best illustrated in FIG. 2, in this particular embodiment the sleeve component 22 is configured as a plurality of individual segments 26 each defining a land portion 28 and a disc portion 30. A plurality of cavities, or voids, 32 are defined between each segment 26, and more particularly defined by the land portions 28 and the disc portions 30. In an embodiment, the land portion 28 proximate each magnet 24 is formed of a laminated magnetic metal to optimize the magnetic reluctance path and reduce eddy currents. Each of the plurality of cavities 32 having disposed therein one or more of the plurality of magnets 24 and configured axially and circumferentially disposed around the rotor shaft 16.

The plurality of individual segments 26 of the sleeve component 22 are configured in tongue-and-groove relationship 34. More specifically, each of the individual segments includes one of a groove portion 36 or a tongue portion 38 so as to provide cooperative adjoining of adjacent segments 26. The tongue-and-groove relationship 34 allows the sleeve component 22 to be supported in smaller segments and thus facilitates reduction in the thickness of the sleeve component 22. The disc portion 30 of each segment 26 is designed to absorb centrifugal loads exerted on the magnets 24 disposed in cavities 32 at high speeds of operation. As such, the disc portions 28 are designed to withstand this centrifugal loading. Each land portion 26 is configured to support only a small (axially) segment of the magnets 24, thus the design can be made with thinner land portions 28. Thinner land portions 28 permit an increase in the overall loading of the rotor machine 10, while more efficient use of the disc portion 30 material permits reduction in weight (mass) of the rotor machine 10. In an embodiment, additional support may be provided about the magnets 24 to minimize fracture of the magnets under large centripetal loads.

The plurality of individual rotor modules 20 are configured to rotate about the longitudinal axis 13 of the permanent magnet machine 10. The rotor assembly 12 may optionally include a plurality of bearings (not shown) disposed therebetween each of the individual rotor modules 20 and in an end position on the axial ends of the rotor shaft 22, referred to as end bearings (not shown), to retain the plurality of individual rotor modules 20 thereon the rotor shaft 22 and to manage the lateral dynamic performance of the rotor assembly 12. The number of rotor modules 20 disposed about the rotor shaft 22 is dependent upon the desired power output of the overall motor assembly, with the more rotor modules 20 included, the higher the power output. In an embodiment, the stator assembly 14 is configured as a continuous stator spanning all the individual rotor modules 20.

The rotor assembly 12 includes the rotor core 40 having a plurality of permanent magnets 24 disposed within the plurality of cavities, or voids, 32 defined by the land portions 28 and disc portions 30 of the sleeve component 22. In an embodiment, the magnetization direction of the permanent magnets 24 may be described as being radial or non-circumferential. In this particular embodiment, the plurality of permanent magnets 24 are configured having a long axis 42 (FIG. 2) oriented substantially radially within the rotor core 40. The permanent magnets 24 generate a magnetic field to be radially directed in the air gap 15 between the rotor assembly 12 and the stator assembly 14. The magnetic field generated by the permanent magnets 24 further interacts with a stator magnetic field produced by its armature currents to produce a torque.

In an embodiment, the permanent magnets 24 may be made of neodymium-boron-iron. In another embodiment, the permanent magnets 24 are made of samarium-cobalt, ferrite, Alnico, or the like. In an embodiment the cylindrical cover 18 and the sleeve component are made of a non-magnetic austenitic nickel-chromium-based superalloy, such as Inconel®. In another embodiment, the sleeve component is made of a non-magnetic material like CFRE, carbon composite or nonmetallic alloy.

Figure 3:
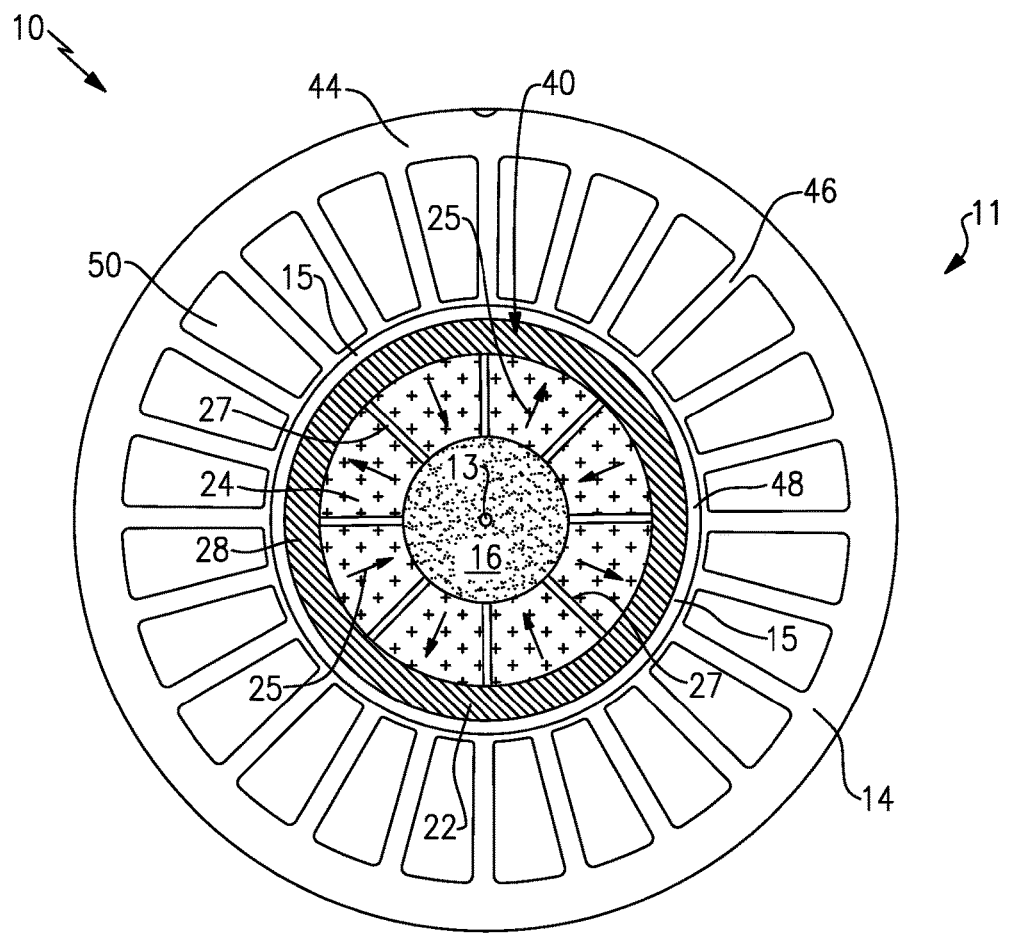
FIG. 3 is an axial cross-sectional view of a rotor and stator assembly taken through line 3-3 of the permanent magnet machine of FIG. 2 in accordance with one or more embodiments shown or described herein.

Referring now to FIG. 3, illustrated is an axial cross-sectional view taken along line 3-3 of FIG. 2 of a portion of the permanent magnet machine 10, and more specifically through the stator assembly 14 and a single rotor module of the plurality of rotor modules 20 of the rotor assembly 12. As illustrated, the rotor assembly 12, and more particularly each of the rotor modules 20 is comprised of the rotor core 40 formed of the sleeve component 22, magnets 24 and the optional cylindrical cover 18 (FIG. 1). The magnets 24 are configured including alternating orientations as indicated by directional arrows 25 in FIG. 3 signifying N-S directions for each of the magnets 24. In addition, a non-magnetic separation material 27 may be included and provide lateral support to magnets 24 when under centripetal loading. In the alternative, the magnetics 24 may be separated by a cavity structure.

The rotor assembly 12 further includes the rotor shaft 16 coupled to the rotor core 40. In an embodiment, the rotor shaft 16 and the rotor core 40 may be keyed so as to be in cooperative engagement. In an embodiment, the rotor shaft 16 may include one or more features, such as protrusions (not shown), in cooperative engagement with one or more features, such as recesses (not shown), in the rotor core 40, or vice versa. In an embodiment, the shaft 16 may include additional features configured to provide passages for a cooling fluid (not shown) within the rotor core 40. In a non-limiting example, the cooling fluid may be airflow or a coolant for reducing mechanical stresses and eddy current losses in the rotor assembly 12.

In this particular embodiment, the stator assembly 14 of the permanent magnet machine 10 includes a stator core 44. As illustrated herein, the stator core 44 includes stator structures 46 arranged circumferentially and forming a cavity 48 (illustrated with the rotor assembly 12 disposed therein) at a center of the stator core 44. The stator assembly 14 generates a magnetic field and extends along the longitudinal axis 13. The rotor assembly 12, as discussed above, is disposed within the cavity 48 defined by the stator core 44. In this particular embodiment, the stator assembly 14 includes multiple stator-slots 50 for armature windings (not shown) in between multiple stator structures 46. The armature windings include copper windings in a variety of topologies and forms. The metal of the stator involved in the flux-carrying path (e.g. the stator core 44 and the stator structure 46) should be magnetic and laminated to reduce eddy current losses.

Figure 4:
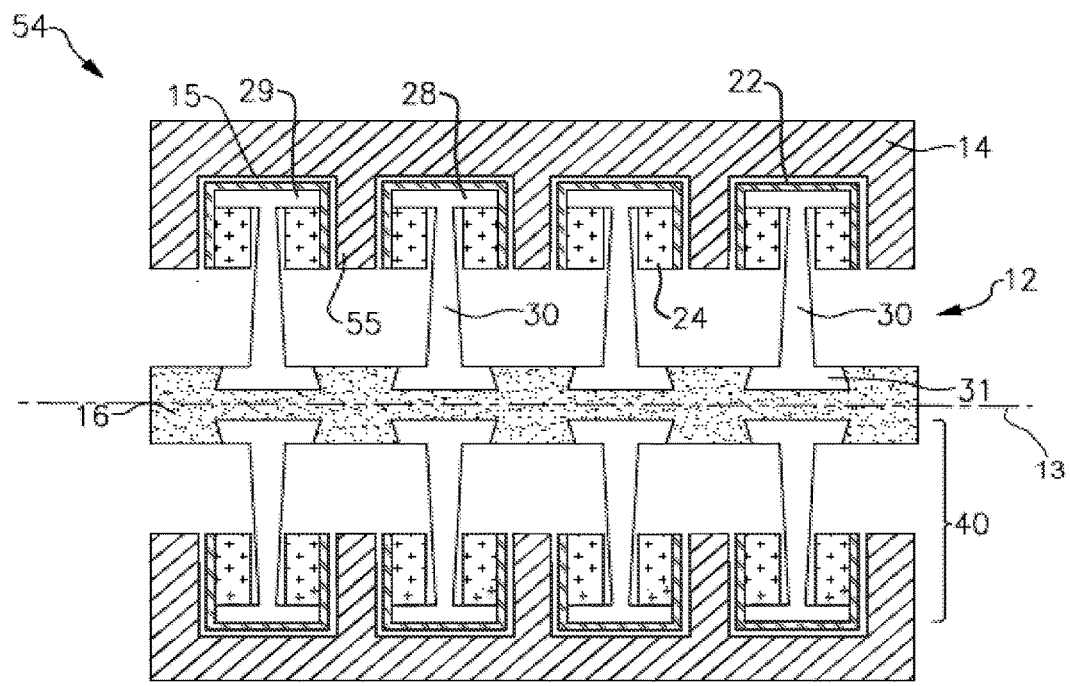
FIG. 4 is an enlarged portion of the longitudinal cross-sectional view of an alternate embodiment of a rotor and stator assembly in accordance with one or more embodiments shown or described herein.
Figure 5:
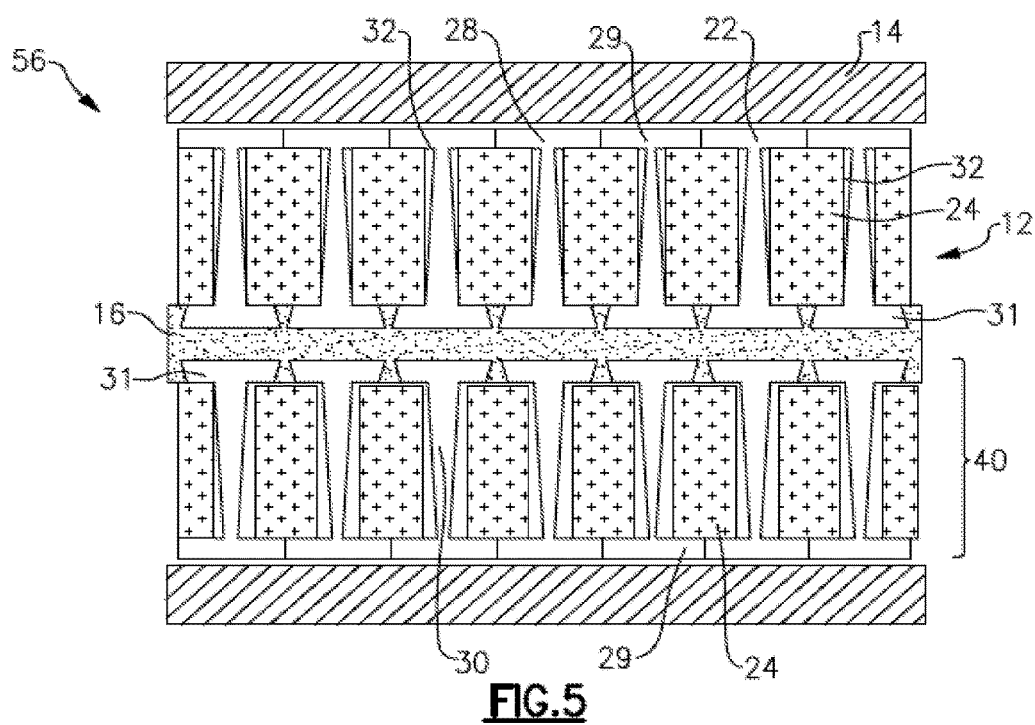
FIG. 5 is an enlarged portion of the longitudinal cross-sectional view of an alternate embodiment of a rotor and stator assembly in accordance with one or more embodiments shown or described herein.

Referring now to FIGS. 4 and 5, illustrated are alternate embodiments of a permanent magnet machine, generally referenced 54 and 56, respectively. The permanent magnet machines 54 and 56 are configured generally similar to permanent magnet machine 10 of FIGS. 1-3. In this particular embodiment, the permanent magnet machine 54 is an axial flux machine and includes a rotor assembly 12 and a stator assembly 14. The rotor assembly 12 generally comprising a rotor core 40, including a sleeve component 22 and a plurality of permanent magnets 24. A rotor shaft 16 is coupled to the rotor core 40.

The rotor assembly 12 includes the plurality of permanent magnets 24 disposed within a plurality of cavities, or voids, 32 formed in the rotor core 40, and more particularly disposed therein the plurality of cavities, or voids, 32 defined in the sleeve component 22. It is advantageous to make at least the portion of the support disc 30 between magnets of a magnetic metal in order to facilitate flux transport for best efficiency.

As best illustrated in FIG. 4, the sleeve component 66 stator assembly 14 is configured to include a stator portion 55 extending between each of the rotor discs portions 30. The magnetic path goes from one disc portion 30 to another through the stator portion 55.

Similar to the previously described embodiment, the rotor assembly 12 includes a plurality of land portions 28 and disc portions 30 provide centrifugal stiffening to the sleeve component 22, thereby permitting a thickness of the sleeve component 22 to be minimized. As a result, the centrifugal load carrying capability of the sleeve component 22 is increased, resulting in an increased speed capability of the rotor assembly 12. In the embodiment illustrated in FIG. 4, the land portions 28 are described as including a radial top land portion 29 and a radial base land portion 31. In an embodiment, the land portions 28 should optimally be made of a magnetic metal at the radial base portion 31 to transmit the flux to the magnetic rotor shaft 16 for return to the stator 14 and at the radial top portion 29 to facilitate magnetic flux transport across the air gap (not shown) to the armature (not shown). In addition, the magnetic material forming the radial top portion 29 may benefit from being laminated to reduce eddy current loses. The disc portion 30 between the radial top and radial base land portions, 29, 31, respectively, should optimally be formed of a non-magnetic material to avoid shorting the flux of the magnets 24.

Referring more specifically to FIG. 5, the permanent magnet machine 56 is a radial flux machine and includes a rotor assembly 12 and a stator assembly 14. The rotor assembly 12 generally comprising a rotor core 40, including a sleeve component 22 and a plurality of permanent magnets 24. A rotor shaft 16 is coupled to the rotor core 40.

The rotor assembly 12 includes the plurality of permanent magnets 24 disposed within a plurality of cavities, or voids, 32 formed in the rotor core 40, and more particularly disposed therein the plurality of cavities, or voids, 32 defined in the sleeve component 22. Similar to the embodiment of FIG. 4, in the embodiment illustrated in FIG. 5, the land portions 28 are described as including a radial top land portion 29 and a radial base land portion 31. In an embodiment, the land portions 28 should optimally be made of a magnetic metal at the radial base portion 31 to transmit the flux to the magnetic rotor shaft 16 for return to the stator 14 and at the radial top portion 29 to facilitate magnetic flux transport across the air gap (not shown) to the armature (not shown). In addition, the magnetic material forming the radial top portion 29 may benefit from being laminated to reduce eddy current loses. The disc portion 30 between the radial top and radial base land portions, 29, 31, respectively, should optimally be formed of a non-magnetic material to avoid shorting the flux of the magnets 24.

In contrast to the axial flux machine of FIG. 4, and as best illustrated in FIG. 5, the sleeve component 22 is configured to in a manner generally similar to the embodiment of FIGS. 1-3 and does not include a stator portion extending between each of the rotor discs portions 30. The magnetic path travels radially from one disc portion 30 to another.

Similar to the previously described embodiments, the plurality of land portions 28 and disc portions 30 provide centrifugal stiffening to the sleeve component 22, thereby permitting a thickness of the sleeve component 22 to be minimized. As a result, the centrifugal load carrying capability of the sleeve component 22 is increased, resulting in an increased speed capability of the rotor assembly 12.

Figure 6:
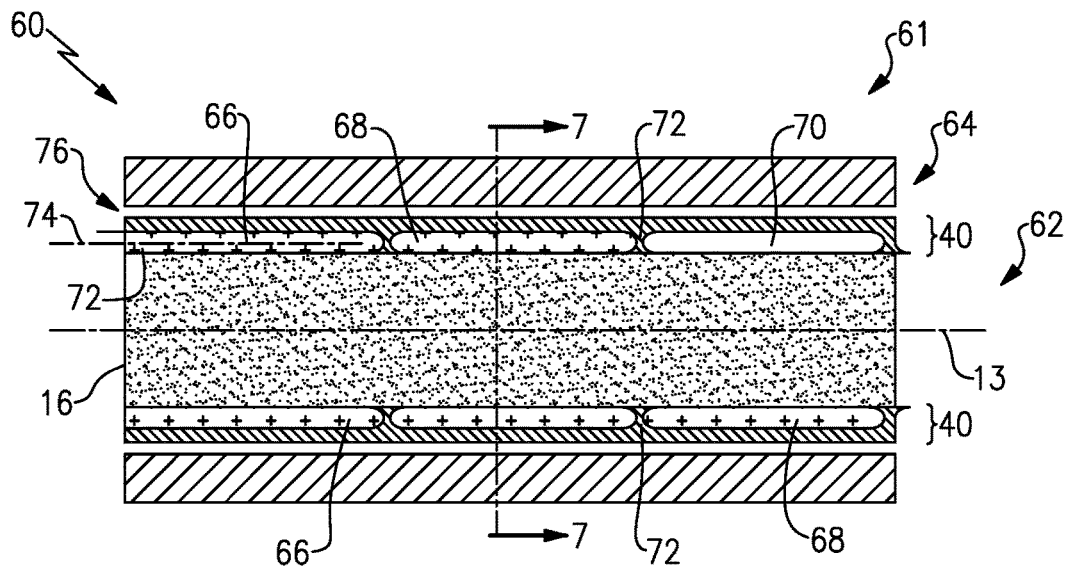
FIG. 6 is a longitudinal cross-sectional view of an alternate embodiment of a portion of a rotor and stator assembly of a permanent magnet machine in accordance with one or more embodiments shown or described herein.
Figure 7:
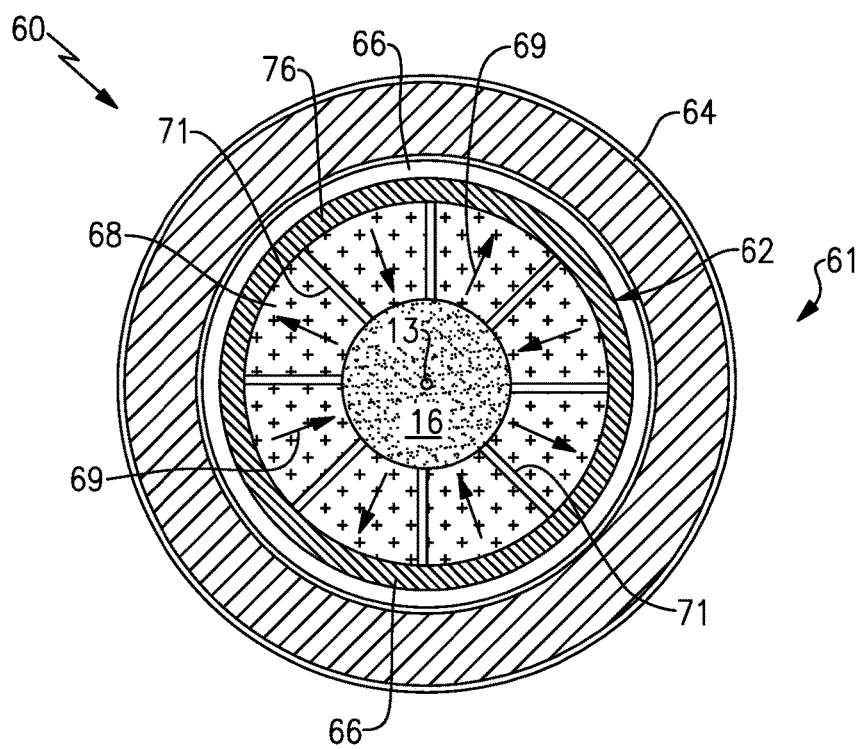
FIG. 7 is an axial cross-sectional view of a rotor and stator assembly taken through line 7-7 of the permanent magnet machine of FIG. 6 in accordance with one or more embodiments shown or described herein

Referring now to FIGS. 6 and 7, illustrated is an alternate embodiment of a permanent magnet machine 60, generally similar to permanent magnet machine 10 of FIGS. 1-3. In an embodiment, the permanent magnet machine 60 is a permanent magnet motor 61, for driving at least one of an aircraft engine, a pump, a wind turbine, a gas turbine, or a generator. In this particular embodiment, the permanent magnet machine 60 includes a rotor assembly 62 and a stator assembly 64. The rotor assembly 62 generally comprising a rotor core 40, including a sleeve component 66 and a plurality of permanent magnets 68. A rotor shaft 16 is coupled to the rotor core 40.

The rotor assembly 62 includes the plurality of permanent magnets 68 disposed within a plurality of cavities, or voids, 70 formed in the rotor core 40, and more particularly disposed therein the plurality of cavities, or voids, 70 defined in the sleeve component 66. For clarity purposes, a single cavity or void 70 is illustrated without a magnet 68 disposed therein. The plurality of permanent magnets 68 are configured including alternating orientations as indicated by directional arrows 69 in FIG. 7 signifying N-S directions for each of the plurality of permanent magnets 68. In addition, a non-magnetic separation material 71 may be included and provide lateral support to plurality of permanent magnets 68 when under centripetal loading. In the alternative, the plurality of permanent magnets 68 may be separated by a cavity structure.

As best illustrated in FIG. 6, the sleeve component 66 is configured including a plurality of internal rib structures 72. The plurality of internal rib structures 72 define the plurality of cavities, or voids, 70. The plurality of internal rib structures 72 provide centrifugal stiffening to the sleeve component 66, thereby permitting a thickness of the sleeve component 66 to be minimized. The plurality of internal rib structures 72 are non-magnetic to avoid shorting the flux path whenever the radial magnetization direction of the plurality of permanent magnets 68 is reversed from one magnet to the next in the axial direction. As a result, the centrifugal load carrying capability of the sleeve component 66 is increased, resulting in an increased speed capability of the rotor assembly 62. The plurality of permanent magnets 68 generate a magnetic field to be radially directed in an air gap 76 between the rotor assembly 62 and the stator assembly 64. In an embodiment, the magnetic field generated by the plurality of permanent magnets 68 further interacts with a stator magnetic field produced by the armature current (similar to that described with regard to the previously described first embodiment) to produce a torque.

The rotor assemblies, as described herein, may further include a stationary tube (not shown) arranged co-axially in the center of the rotor core 40. An inner surface of the shaft 16 and an outer surface of the stationary tube may provide a rotor inner bore for out flow of a cooling fluid. Additionally, in an embodiment, a filler material (not shown) may be included within the plurality of cavities, or voids, formed in the rotor assembly to further provide containment in case of magnet crack.

Advantageously, the various embodiments disclosed herein provide a permanent magnet machine in which reducing the weight of the overall machine results in increased machine capability and reduces cost of the machine. More particularly, the provided permanent magnet machine as disclosed herein is capable of running at higher speeds and loads, effectively permitting a smaller machine to handle higher loads.

The rotor assembly and the various associated components are primarily configured to provide a reduction in the overall weight to provide increased centrifugal load capacity of the assembly and maximize power density and electrical performance. Furthermore, the present disclosure provides additional advantages in terms of low volume, mass and cost. These techniques and systems thus, allow for highly efficient permanent magnet machines.

The permanent magnet machines, as described above, may be well suited as a driving force for many applications. Such permanent magnet machines may be employed in aviation applications, such as in aircraft engines, pump applications, or the like. The permanent magnet machines can also be used for other non-limiting examples such as traction applications, wind and gas turbines, starter-generators for aerospace applications, industrial applications and appliances.

Of course, it is to be understood that not necessarily all such objects or advantages described above may be achieved in accordance with any particular embodiment. Thus, for example, those skilled in the art will recognize that the assemblies and techniques described herein may be embodied or carried out in a manner that achieves or optimizes one advantage or group of advantages as taught herein without necessarily achieving other objects or advantages as may be taught or suggested herein.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While only certain features of the embodiments have been illustrated and described herein, many modifications and changes will occur to those skilled in the art. It is, therefore, to be understood that the appended claims are intended to cover all such modifications and changes as fall within the true spirit of the invention.

What is claimed is:

1. A rotor assembly for a permanent magnet machine configured to rotate about a longitudinal axis, the rotor assembly comprising:
   a rotor shaft; and
   at least one rotor module configured to generate a magnetic field, whose magnetic field interacts with a stator magnetic field to produce a torque, the at least one rotor module disposed about the rotor shaft, the at least one rotor module comprising:
      a plurality of permanent magnets;
      a sleeve component including a rotor including an axially extending radial base rotor land portion defining a dovetail coupling oriented tangentially relative to the rotor shaft and coupling the radial base rotor land portion thereto the rotor shaft, the rotor further including an axially extending radial top rotor land portion radially spaced a distance from the axially extending radial base rotor land portion, and a radially extending rotor disc portion spanning therebetween the axially extending radial top rotor land portion and the axially extending radial base rotor land portion to provide centrifugal stiffening and a plurality of cavities defined therein the sleeve component by the axially extending radial top rotor land portion and a portion of the radially extending rotor disc portion, wherein at least one of the plurality of permanent magnets is disposed within one of the plurality of cavities formed in the sleeve component to retain the at least one permanent magnet therein and form an interior permanent magnet motor.

2. The rotor assembly as claimed in claim 1, further comprising a plurality of rotor modules configured in an end-to-end axial alignment and cooperative engagement.

3. The rotor assembly as claimed in claim 1, wherein the sleeve component is configured as a segmented component including a plurality of individual sleeve segments and wherein adjacent sleeve segments are cooperatively adjoined.

4. The rotor assembly as claimed in claim 1, wherein the sleeve component further comprises one or more internal rib structures further defining the plurality of cavities and providing centrifugal stiffening.

5. The rotor assembly as claimed in claim 1, wherein a magnetization direction of each of the plurality of permanent magnets is configured axial relative to the longitudinal axis of the rotor assembly.

6. The rotor assembly as claimed in claim 1, wherein each of the plurality of permanent magnets is separated from another one of the plurality of permanent magnets by a non-magnetic material.

7. A rotor assembly for a permanent magnet machine configured to rotate about a longitudinal axis, the rotor assembly comprising:
   a rotor shaft; and
   a plurality of rotor modules configured to generate a magnetic field, whose magnetic field interacts with a stator magnetic field to produce a torque, the plurality of rotor modules disposed about the rotor shaft in an end-to-end axial alignment, each of the plurality of rotor modules defining a rotor core comprising:
      a plurality of permanent magnets; and
      a sleeve component including a rotor including an axially extending radial base rotor land portion defining a dovetail coupling oriented tangentially relative to the rotor shaft and coupling the radial base rotor land portion thereto the rotor shaft, the rotor further including an axially extending radial top rotor land portion radially spaced a distance from the axially extending radial base rotor land portion, and a radially extending rotor disc portion spanning therebetween the axially extending radial top rotor land portion and the axially extending radial base rotor land portion to provide centrifugal stiffening and a plurality of cavities defined therein the sleeve component by the axially extending radial top rotor land portion and a portion of the radially extending rotor disc portion, wherein at least one of the plurality of permanent magnets is disposed within one of the plurality of cavities formed in the sleeve component to retain the at least one permanent magnet therein and form an interior permanent magnet motor, wherein a magnetic axial flux path is defined from the disc portion of the at least one rotor module to another disc portion of another of the at least one rotor module through a stator portion extending between each of the rotor discs portions.

8. The rotor assembly as claimed in claim 7, wherein the sleeve component is configured as a segmented component including a plurality of individual sleeve segments.

9. The rotor assembly as claimed in claim 7, wherein each of the plurality of permanent magnets is separated from another one of the plurality of permanent magnets by a non-magnetic material.

10. A permanent magnet machine comprising:
a stator assembly comprising a stator core and including stator windings to generate a stator magnetic field when excited with alternating currents, the stator assembly extending along a longitudinal axis with an inner surface defining a cavity; and
a rotor assembly disposed inside said cavity and configured to rotate about the longitudinal axis, wherein the rotor assembly comprises at least one rotor module configured to generate a magnetic field, which magnetic field interacts with a stator magnetic field to produce a torque, the at least one rotor module comprising:
a plurality of permanent magnets; and
a sleeve component including a rotor including an axially extending radial base rotor land portion defining a dovetail coupling oriented tangentially relative to the rotor shaft and coupling the radial base rotor land portion thereto the rotor shaft, the rotor further including an axially extending radial top rotor land portion radially spaced a distance from the axially extending radial base rotor land portion, and a radially extending rotor disc portion spanning therebetween the axially extending radial top rotor land portion and the axially extending radial base rotor land portion to provide centrifugal stiffening and a plurality of cavities defined therein the sleeve component by the axially extending radial top rotor land portion and a portion of the radially extending rotor disc portion, wherein at least one of the plurality of permanent magnets is disposed within one of the plurality of cavities formed in the sleeve component to retain the at least one permanent magnet and form an interior permanent magnet motor, wherein an air gap is defined between the rotor assembly and the stator assembly.

11. The permanent magnet machine as claimed in claim 10, wherein the sleeve component is configured as a segmented component including a plurality of individual sleeve segments and wherein adjacent sleeve segments are cooperatively adjoined.

12. The permanent magnet machine as claimed in claim 10, wherein the sleeve component further comprises one or more internal rib structures further defining the plurality of cavities and providing centrifugal stiffening.

13. The permanent magnet machine as claimed in claim 10, wherein each of the plurality of permanent magnets is separated from another one of the plurality of permanent magnets by a non-magnetic material.

14. The permanent magnet machine as claimed in claim 10, wherein the permanent magnet machine is an axial flux machine.

15. The permanent magnet machine as claimed in claim 10, wherein the permanent magnet machine is a radial flux machine.

16. The permanent magnet machine as claimed in claim 10, wherein the permanent magnet machine is a permanent magnet motor for driving at least one of an aircraft engine, a pump, a wind turbine, a gas turbine, or a generator.

* * * * *